US008678632B2

(12) United States Patent
Gallai et al.

(10) Patent No.: US 8,678,632 B2
(45) Date of Patent: Mar. 25, 2014

(54) REPLACEABLE LIGHT EMITTING DIODE MODULE WITH HIGH OPTICAL PRECISION

(75) Inventors: Jozsef Gallai, Budapest (HU); Zoltan Bako, Budapest (HU); Istvan Mudra, Budapest (HU); Imre Molnar, Budapest (HU); Laszlo Nagy, Budapest (HU); Krisztian Mihaly Kovacs, Budapest (HU)

(73) Assignee: General Electric Company, Schenectady, NY (US)

( * ) Notice: Subject to any disclaimer, the term of this patent is extended or adjusted under 35 U.S.C. 154(b) by 630 days.

(21) Appl. No.: 12/870,062

(22) Filed: Aug. 27, 2010

(65) Prior Publication Data

US 2012/0049733 A1 Mar. 1, 2012

(51) Int. Cl.
*B60Q 1/00* (2006.01)

(52) U.S. Cl.
USPC ............ 362/548; 362/546; 362/647; 362/655

(58) Field of Classification Search
USPC ......... 362/546, 548–549, 647, 655–656, 368, 362/372–373, 457, 294, 294.02, 249.07
See application file for complete search history.

(56) References Cited

U.S. PATENT DOCUMENTS

2005/0180157 A1 8/2005 Watanabe
2007/0279921 A1 12/2007 Alexander et al.
2009/0213595 A1 8/2009 Alexander et al.
2010/0067248 A1 3/2010 Frey
2011/0063849 A1 * 3/2011 Alexander et al. ............ 362/294
2011/0075414 A1 * 3/2011 Van De Ven et al. ......... 362/235

FOREIGN PATENT DOCUMENTS

EP 2306078 A2 4/2011
FR 2649185 A1 1/1991

OTHER PUBLICATIONS

PCT Search Report issued in connection with corresponding WO Patent Application No. US2011/040441 filed on Jun. 15, 2011.

* cited by examiner

*Primary Examiner* — Anh Mai
*Assistant Examiner* — Kevin Quarterman
(74) *Attorney, Agent, or Firm* — Fay Sharpe LLP

(57) ABSTRACT

A replaceable lighting module in an LED light source is provided. The module improves thermal, mechanical, and electrical connection with an associated fixture. The replaceable module also provides for precise positioning and improves on optical properties of the light distribution.

19 Claims, 6 Drawing Sheets

REPLACEABLE LIGHT EMITTING DIODE MODULE WITH HIGH OPTICAL PRECISION

BACKGROUND OF THE DISCLOSURE

This disclosure relates to a lighting module, and more particularly to a replaceable light emitting diode (LED) module with integrated optics and thermal management features. This disclosure finds particular application in the automotive industry where optical precision is demanded, although selected attributes and features may be used in related environments and applications where similar issues may be encountered.

Generally, LED based lighting assemblies used for forward lighting in automotive applications include an LED light source that cooperates with a separate optics assembly for handling light output from the light source. Light output is less optimal as a result of separately assembling the light source with the separate optics assembly.

Further, LED lighting assemblies incorporated into forward lighting applications are not easily replaceable. Consequently, although LED light sources are efficient and have an extended operating life, if a problem should occur or the light source fails, then it is necessary to remove the entire light source. Moreover, no provision is made for precisely aligning the new LED light source with the associated optics.

Another important aspect of using high efficiency LED light sources is the need to address thermal issues. Specifically, LED light sources operate at elevated temperatures and effectively conveying away heat maintains the benefits of the high efficiency and extended life of this type of light source.

Accordingly, a need exists to provide an LED light source that is a replaceable module and is operatively integrated with the optical system. Further, such an assembly must adequately manage thermal concerns and be easily and accurately mounted to the associated automotive vehicle.

SUMMARY OF THE DISCLOSURE

A replaceable light assembly for an automotive vehicle is disclosed. The assembly includes a housing having at least one light emitting diode (LED) assembly and a lens received over and secured to the LED assembly. An electrical circuit received in the housing conditions voltage from the automotive vehicle for operating the LED assembly. A base advantageously conducts heat from the LED assembly, while a positioning mechanism optically aligns and positions the housing relative to the associated automotive vehicle.

In an exemplary embodiment, an enlarged thermal mass conveys heat from the LED assembly.

In one embodiment, the base includes first and second members having cooperating convex and concave surfaces, respectively, for orienting the LED assembly relative to the lens, and the convex and concave surfaces have different curvatures.

A primary benefit provided by the new assembly is the ability to replace both the light source and the optics as a unit.

Another advantage relates to obtaining precise alignment between the LED light source and the optical arrangement.

Still another benefit is the ability to accurately position the replaceable LED module relative to the associated vehicle.

Yet another advantage relates to improving overall lamp life and efficiencies by incorporating thermal management features into the replaceable module design.

An additional benefit is the incorporation of electronics, therefore the module can be directly driven from the car board voltage system without further electronic drive.

Still other benefits and advantages may become more apparent to one skilled in the art upon reading the following detailed description.

DETAILED DESCRIPTION OF THE PREFERRED EMBODIMENTS

Figure 1:
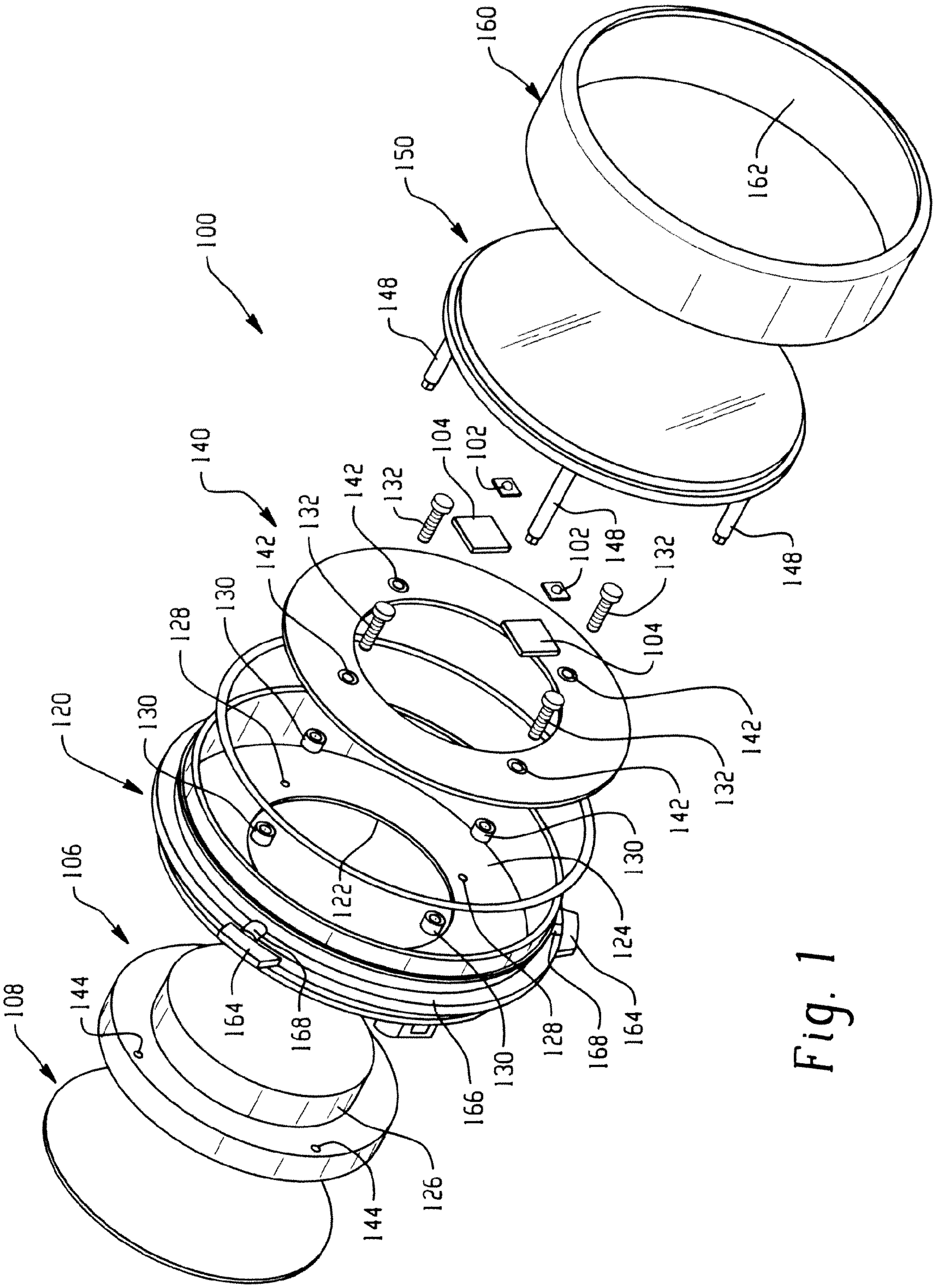
FIG. 1 is an exploded perspective view of a first preferred embodiment of a replaceable LED module.
Figure 2:
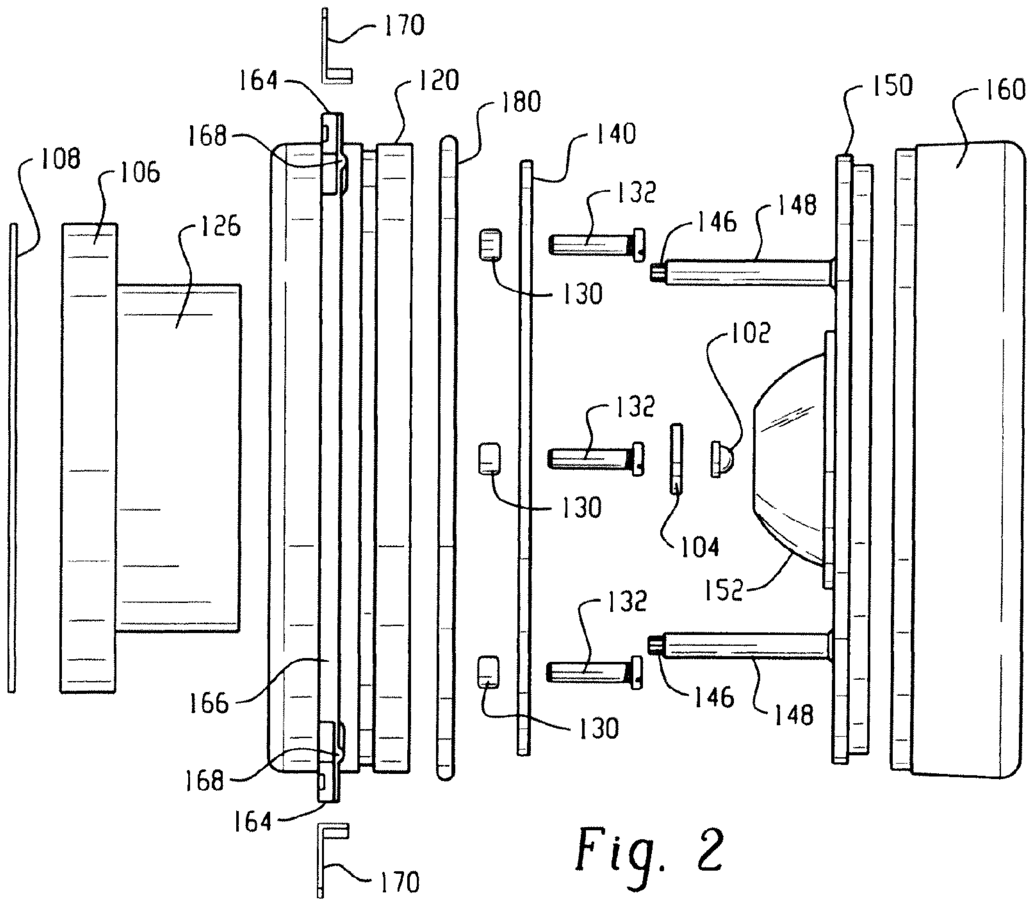
FIG. 2 is an elevational, exploded view of the embodiment of FIG. 1.
Figure 3:
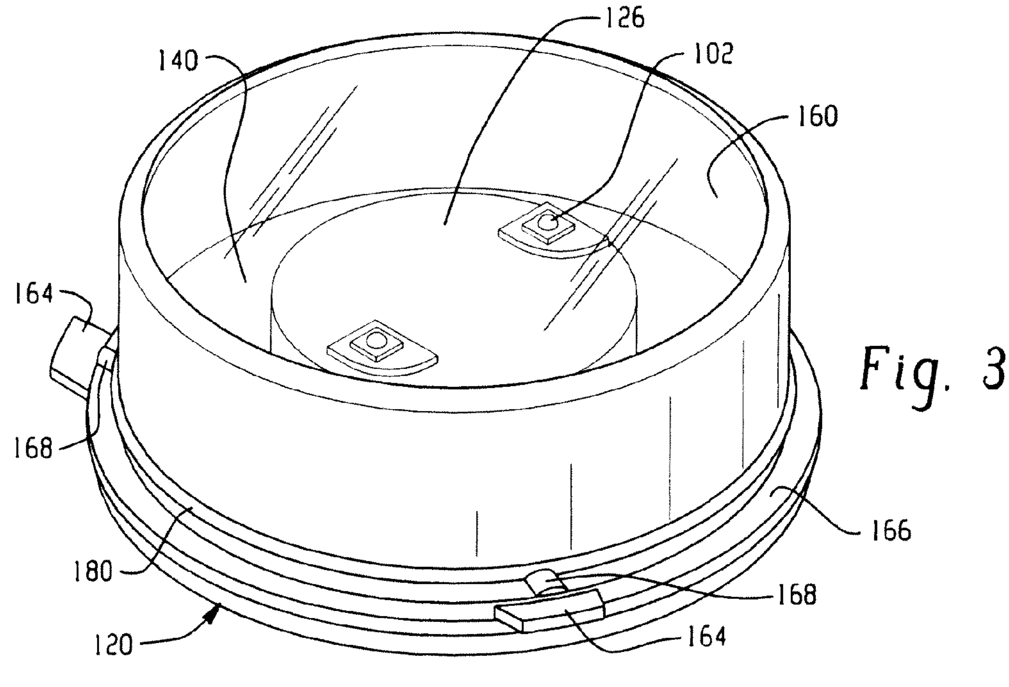
FIG. 3 is a perspective view of the partially assembled lamp assembly of FIG. 1.

Shown in FIGS. 1-4 is a first preferred embodiment of a replaceable LED module 100 having high optical precision, for example, as demanded in the automotive industry. The lighting module 100 is replaceable and preferably employs an LED (light emitting diode) light source, and advantageously makes desired thermal, mechanical, and electrical connection possible to an associated fixture, while still obtaining high optical precision of light distribution.

More particularly, the module 100 includes a light source which, in this arrangement, is at least one light emitting diode 102 and preferably multiple LEDs as may be required for a particular application such as forward lighting arrangements. In the automotive industry, such forward lighting arrangements include using the module as a daytime running light (DRL) or other applications such as a position light or index light. In this embodiment, each LED 102 includes an associated respective printed circuit board (PCB) 104. PCB 104 is provided for the LED only. Once mounted on the associated printed circuit board 104, the light source 102 is, in turn, mounted on a thermally conductive block such as metal block 106 which in the present arrangement has a significant disk-like dimension to provide a desired thermal mass for conveying heat from the LED 102 and PCB 104. Since LED-based lamps typically operate at a temperature below 200 degrees C. or more preferably in some instances at 100 degrees C. or even lower, the heat transfer pathway is important. Convection and conduction are the predominant forms of heat transfer that can be enhanced by use of a heat sink. The heat sink, or metal block in this instance, is a component providing a large surface area for radiating and convecting heat away from the LED devices. A relatively massive metal element having a large engineered surface area efficiently conducts heat from the LED devices and the large area of the mass provides efficient heat egress by radiation and convection. In this manner, heat conducted by the LEDs is advantageously transferred to the metal block 106 located at the rear of the module 100. In addition, the heat is conveyed to a heat conducting foil or layer 108 disposed at an opposite end of the block 106 from the light source. Heat is thereby effectively conveyed from the LEDs 102 through the metal block 106 to the heat conducting foil 108 and thus to the surrounding ambient environment for effective thermal management of the lighting module 100. In addition to the heat convective function of the heat conducting foil 108, the conducting foil 108 may be connected to further heat sinks (not shown) operatively associated with the headlamp. For example, additional heat sinks may be needed if further light sources are used in order to reduce the operational temperature of the headlamp. Preferably, the printed circuit board 104 that carries the LEDs 102 is connected to the metal block 106 with a heat conductive adhesive to further enhance the thermal conveying properties of the lighting module 100.

Housing 120 is shown in the preferred arrangement as a generally annular structure having an opening 122 formed in a first or rear wall 124. The opening 122 is dimensioned to receive a nose portion 126 of the metal block 106 therethrough. In addition, small dimensional openings 128 are provided in the wall 124 and cooperate with spacers 130 for receipt of fasteners such as threaded screws 132. The fasteners extend through a mounting plate 140, particularly openings 142 in the mounting plate, which is supported by the spacers 130 at a predetermined dimension from the back wall 124 (FIG. 4), pass through the openings 128 in the housing wall 124, and are secured to the metal block 106—specifically, the fasteners are secured to threaded openings 144 in the block.

Figure 4:
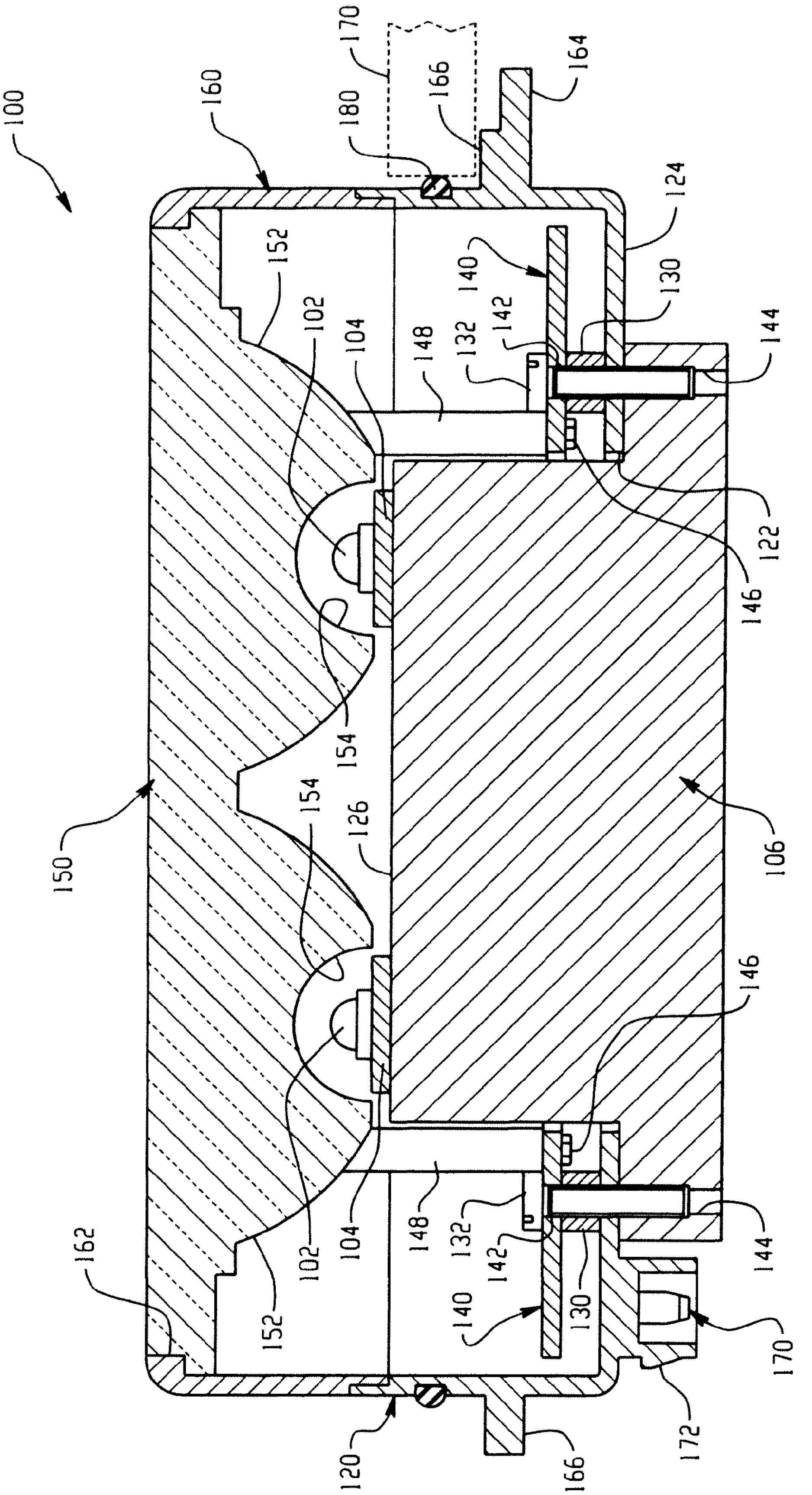
FIG. 4 is a cross-sectional view through the assembled lighting module of FIG. 1.

As is also evident in FIG. 4, the mounting plate 140 serves the dual purpose of mechanical assembly, but also advantageously is itself a PCB that contains the electronic circuit that drives the LED light source through the LED PCB 104 from the voltage supplied from the automotive vehicle. The mounting plate receives fasteners 146 associated with axially extending mounting legs 148 of light distributing lens 150. As perhaps best illustrated in FIGS. 2 and 4, the lens 150 includes enlarged lens portions 152 having recesses 154 that are generally hemispherical in cross-section and oriented to capture light directed outwardly from the LEDs. A second portion 160 of the housing 120 forms a cover that is a substantially annular ring having an opening 162 dimensioned to retainingly engage the light distributing lens 150. The second portion preferably snap-fits or is adhesively secured to the remainder of the housing 120 (FIG. 4).

Peripherally spaced locating flanges or tabs 164 are shown extending radially outward from a rim 166 that is provided about the perimeter of the housing 120. The three or more spaced tabs 164 provide for connection with an associated fixture. Curved protrusions 168 extend axially outward from the rim 166 (see FIGS. 1-3) and provide for high precision alignment of the housing, i.e., the three protrusions 168 define a desired reference plane by abutting against one or more surfaces 170 (FIG. 4) of the associated fixture (not shown). The protrusions are preferably located adjacent the tabs 164 which are the regions that secure the housing to the fixture. Therefore, the securing forces will be maximized adjacent the tabs and thus the reference plane formed by the protrusions 168 will be stable. Of course it will be appreciated that the protrusions may be formed on the tabs rather than on the rim so that when the housing is secured to the fitting, the LED light source is pushed against the protrusions defining the optical axis. Because the LED light source 102 and the light distributing lens 150 are fixed relative to the housing, once the tabs 164 define the reference plane, the light output is precise relative to the associated fixture that abuts the tabs 164. If one or more of the LEDs 102 were to fail, the entire module 100 can be easily removed from the fixture and a similar, replaceable LED module secured in place without any loss in light output, distribution, and precision.

Electrical connection in the embodiment of FIGS. 1-4 is provided through connector 170. The connector 170 preferably has a snap-fit shoulder 172 integrally formed in the surrounding housing so that a male component (not shown) of the electrical connection can establish secure and effective mechanical and electrical contact. In addition, seal ring 180 is preferably provided along a perimeter of the housing 120 for sealing interconnection with the associated fixture (not shown). The seal serves to prevent ingress of moisture into the lighting module when the module is secured to the fixture.

Figure 6:
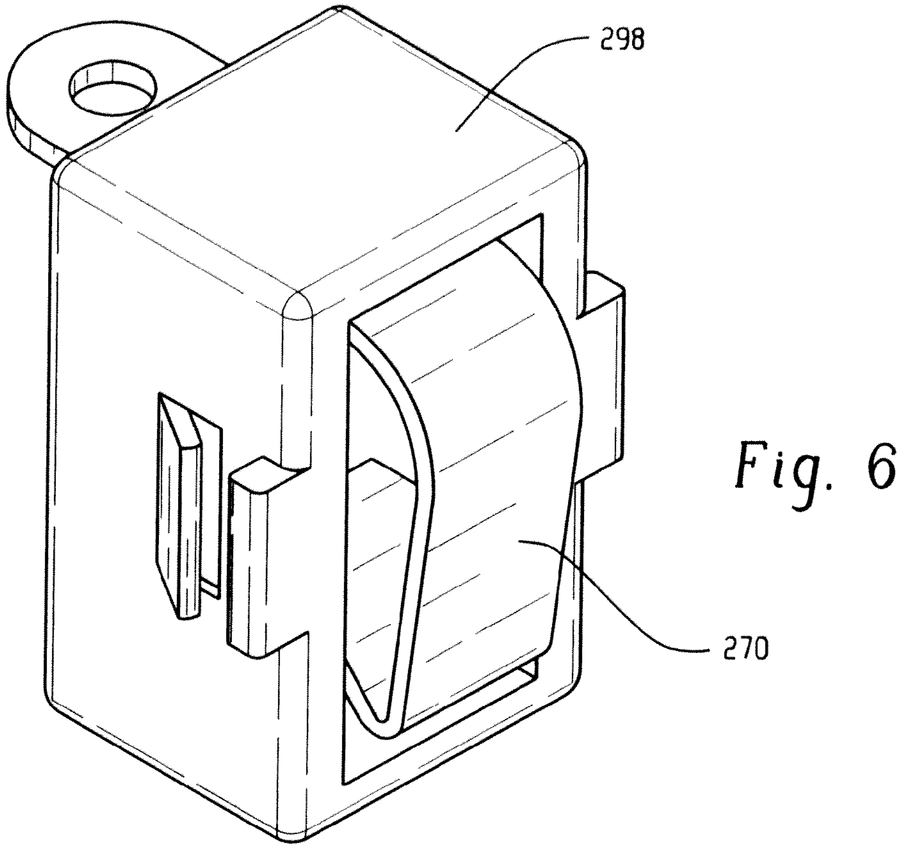
FIG. 6 is an enlarged perspective view of an electrical connection provided on the housing.
Figure 7:
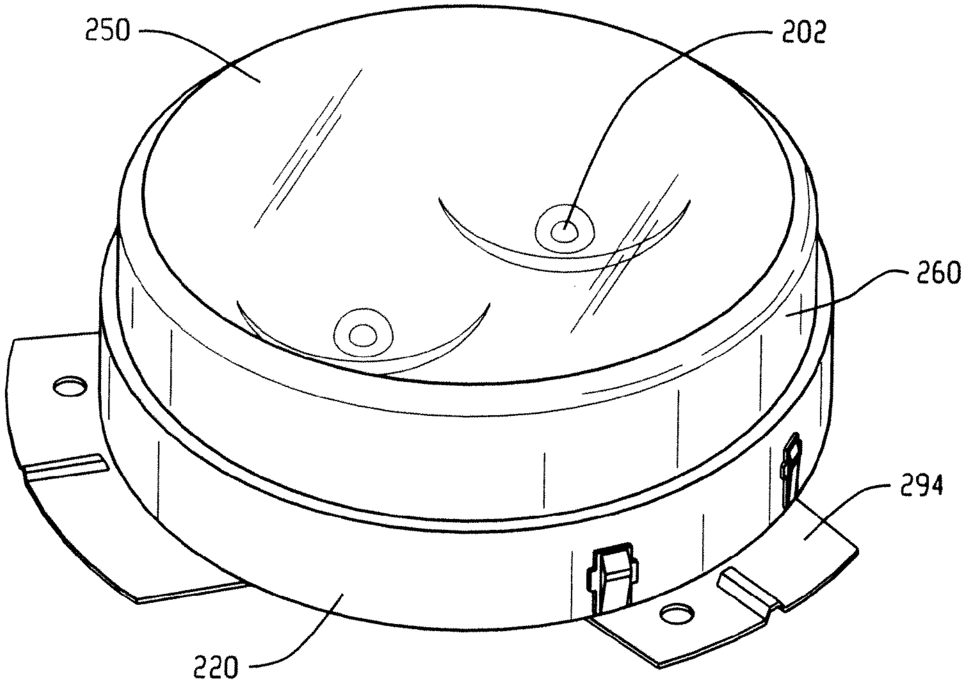
FIG. 7 is an enlarged perspective view of the assembled lighting module of FIG. 5.
Figure 8:
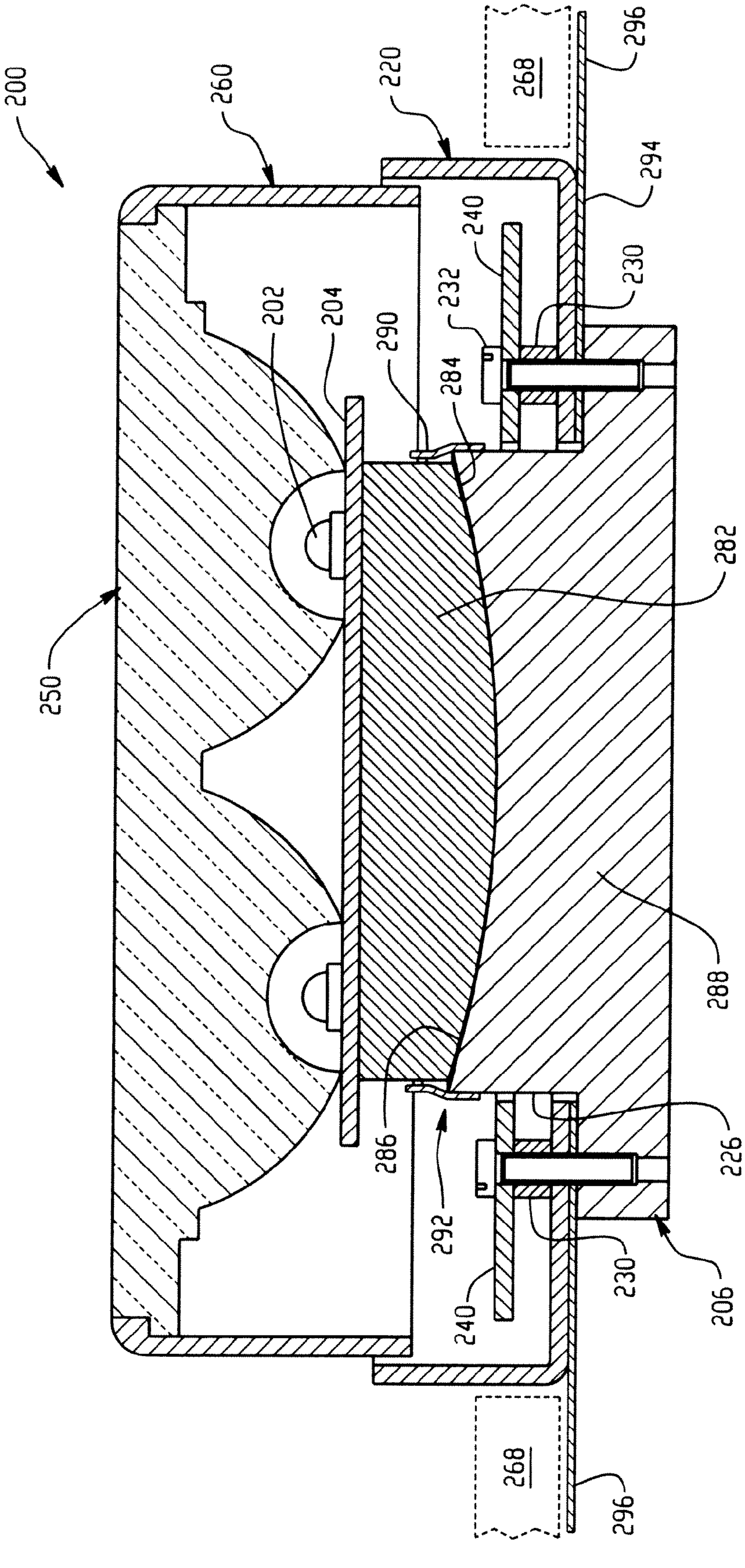
FIG. 8 is an enlarged cross-sectional view of the assembled lighting module of FIG. 5.

FIGS. 5-8 illustrate a second embodiment of the replaceable LED module. Where possible, like reference numerals in the "200" series will be used to identify like components while new reference numerals indentify new components. Thus, replaceable LED module 200 includes a light source comprised of one or more LEDs 202. The LEDs 202 may be operatively associated with a single printed circuit board 204 that receives the LEDs on one surface and makes contact with a thermally conductive sheet or heat conductive foil layer 208 on an opposite surface, which then is in thermal contact with an additional heat conductive mass 282. As is best illustrated in FIG. 8, the thermal component 282 also has a generally convex surface 284 that cooperates with concave surface 286 of metal block 288. The convex and concave surfaces 284, 286 provide for selective adjustment as a result of having different curvatures along their abutting, contacting surfaces. Once the desired setting of the direction of light distribution is finalized, extensions 290 or metal tabs extending from ring 292 can be fused or welded to hold the components in place.

In addition, rather than having integrated flanges or tabs 164 associated with a rim 166 as employed in the earlier embodiment, alignment is provided by a separate plate 294 that has three or more lobes 296 (FIG. 5) for establishing the reference plane of the replaceable LED module by abutting contact with a reference surface 268 (FIG. 8) of the associated fixture.

Figure 5:
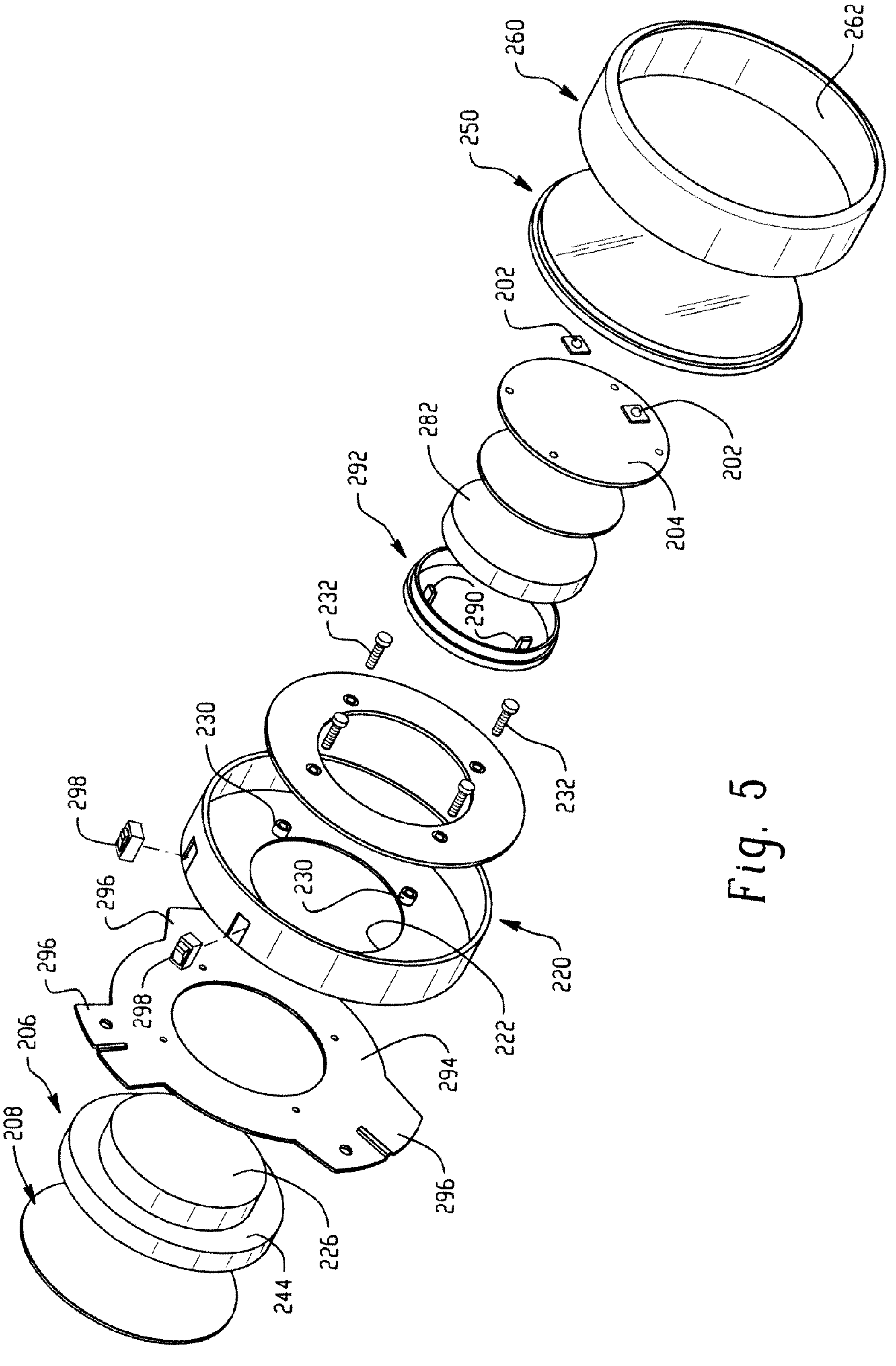
FIG. 5 shows an exploded, perspective view of a second preferred embodiment of a replaceable LED module.

In addition, and as best illustrated in FIGS. 5, 6, and 7, electrical connector 270 includes housing portions 298 that receive the electrical connectors 270 in a spring clip arrangement. When secured to the housing 220, the connectors 270 extend radially outward to provide a spring contact and suitable electrical connection with the associated fixture (not shown). Again, this provides for a high precision alignment and also provides means for defining the optical plane of the lamp via the lobes 296, and the adjusting blocks 282, 288 and the associated convex and concave surfaces 284, 286, respectively. The spring force also pushes the module in the opposite direction, ideally against a defined prism of the receiving socket adequately defining the optical axis of the module. Heat generated by the LEDs 202 is similarly conducted by the metal blocks 282, 288 to the rear of the lighting module 200 where the heat conductive foil 208 helps to distribute the heat to the ambient environment or further heat sinks in the same manner as described in connection with the first embodiment. The void between the concave and convex surfaces of the metal blocks 282 and 288 is filled with heat conducting material such as a paste to enhance heat transfer there. This enhances thermal management of the lighting module.

Setting the direction of the light distribution is also simplified by using the convex and concave surfaces 284, 286 that have slightly different curvatures along their contacting surfaces and subsequently fixing the position of these two components when aligned in the desired manner. Likewise, electrical connection is achieved in an efficient manner with the spring contact 270 provided on the generally cylindrical surface of the housing. Although only two terminals or contacts 270 are shown, it will be understood by one skilled in the art that additional sockets or terminals may be provided, for example for use with dimming options, where the module can fulfill the requirements of different applications.

The LED-based assemblies provide for effective forward lighting and are advantageously replaceable. This eliminates problems associated with replacing just the light source without the optics so that precision alignment and desired light distribution are achieved. In addition, the replaceable module addresses the complicated thermal management concerns by providing a sufficient thermal mass that conducts the heat to the rear of the module. Also the electronic drive circuit is integrated into the assembly and permits the light source to be driven by the voltage provided by the automotive vehicle.

The disclosure has been described with reference to the preferred embodiments. Obviously, modifications and alterations will occur to others upon reading and understanding the preceding detailed description. It is intended that the disclosure be construed as including all such modifications and alterations.

What is claimed is:

1. A replaceable light assembly for an associated automotive vehicle comprising:

a housing;

at least one light emitting diode (LED) assembly received in the housing;

a lens received over and secured to the LED assembly;

an electrical circuit received in the housing that conditions voltage from the associated automotive vehicle for operating the LED assembly;

a base that conducts heat from the LED assembly, the base includes first and second members having cooperating surfaces to provide selective adjustment for orienting the LED assembly relative to the lens, wherein the first and second members of the base include cooperating convex and concave surfaces, respectively, for orienting the LED assembly; and a positioning mechanism for optically aligning and positioning the housing relative to the associated automotive vehicle.

2. The replaceable light assembly of claim 1 further comprising a mass of heat conductive material in thermal contact with the LED assembly.

3. The replaceable light assembly of claim 1 wherein the optical positioning mechanism includes at least three positioning protrusions and at least three tabs disposed on the housing for orienting the LED assembly.

4. The replaceable light assembly of claim 1 further comprising a mechanical fastener for securing the LED and lens to the housing.

5. The replaceable light assembly of claim 1 further comprising an enlarged thermal mass for conveying heat from the LED assembly.

6. The replaceable light assembly of claim 1 wherein the lens includes individual lens portions each having a generally hemispherical recess that each surrounds an individual LED.

7. The replaceable light assembly of claim 1 wherein the LED assembly and lens are fixed to the housing whereby the light distribution from the LED assembly is precisely located relative to the lens to maximize light distribution.

8. The replaceable light assembly of claim 1 wherein the base includes an enlarged metal block that cooperates with a thermally conductive pad.

9. The replaceable light assembly of claim 1 wherein the convex and concave surfaces have different curvatures.

10. The replaceable light assembly of claim 1 further comprising an electrical connector on the housing.

11. The replaceable light assembly of claim 10 wherein the electrical connector is located along a peripheral portion of the housing.

12. The replaceable light assembly of claim 1 wherein the electrical circuit includes a printed circuit board secured to the base and a separate printed circuit board operatively associated with the LED assembly.

13. The replaceable light assembly of claim 1 further comprising a seal member configured for sealing interconnection between the housing and an associated fixture.

14. A light assembly for an associated automotive vehicle comprising:

a housing;

at least one light emitting diode (LED) assembly received in the housing;

a positioning mechanism for optically aligning and positioning the LED assembly and housing relative to the associated automotive vehicle;

a lens received over and secured to the LED assembly;

a metal base at least partially received in the housing and on which the LED assembly is mounted for conducting heat therefrom, the metal base includes first and second members having cooperating surfaces to provide selective adjustment for orienting the LED assembly relative to the lens, wherein the base includes first and second members having cooperating convex and concave surfaces, respectively, for orienting the LED assembly relative to the lens.

15. The replaceable light assembly of claim 14 wherein the positioning mechanism includes at least three positioning protrusions and at least three tabs disposed on the housing for orienting the light assembly.

16. The replaceable light assembly of claim 14 wherein the convex and concave surfaces have different curvatures.

17. The replaceable light assembly of claim 14 wherein the LED assembly and lens are fixed to the housing whereby the light distribution from the LED assembly is precisely located relative to the optical plane defined by the metal base to maximize light distribution.

18. The replaceable light assembly of claim 14 further comprising an electrical connector located along a peripheral portion of the housing for establishing electrical contact with the associated vehicle.

19. The replaceable light assembly of claim 14 further comprising a seal member configured for sealing interconnection between the housing and an associated fixture.

* * * * *